US009969113B2

(12) United States Patent
Lee et al.

(10) Patent No.: US 9,969,113 B2
(45) Date of Patent: May 15, 2018

(54) WIRELESS SENSOR FOR ELECTROMAGNETICALLY SHIELDED APPLICATIONS AND METHOD OF COMMUNICATION

(71) Applicant: Board of Regents of the University of Texas System, Austin, TX (US)

(72) Inventors: Kyehwan Lee, McAllen, TX (US); Heinrich Foltz, Edinburg, TX (US); Rajiv Nambiar, McAllen, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 698 days.

(21) Appl. No.: 14/595,535

(22) Filed: Jan. 13, 2015

(65) Prior Publication Data
US 2015/0197055 A1 Jul. 16, 2015

Related U.S. Application Data

(60) Provisional application No. 61/927,217, filed on Jan. 14, 2014.

(51) Int. Cl.
| | |
|---|---|
| *G01K 1/00* | (2006.01) |
| *G01K 13/00* | (2006.01) |
| *G08C 19/12* | (2006.01) |
| *B29C 45/78* | (2006.01) |
| *B29C 45/77* | (2006.01) |
| *H04B 1/04* | (2006.01) |
| *G01L 19/08* | (2006.01) |
| *G01D 11/24* | (2006.01) |

(52) U.S. Cl.
CPC .............. *B29C 45/78* (2013.01); *B29C 45/77* (2013.01); *G01D 11/245* (2013.01); *G01K 13/00* (2013.01); *G01L 19/086* (2013.01); *H04B 1/04* (2013.01); *B29C 2945/7604* (2013.01); *B29C 2945/76006* (2013.01); *B29C 2945/76257* (2013.01); *B29C 2945/76458* (2013.01); *B29C 2945/76498* (2013.01); *B29C 2945/76531* (2013.01)

(58) Field of Classification Search
USPC ................... 374/143, 141; 340/584, 870.17
See application file for complete search history.

(56) References Cited

U.S. PATENT DOCUMENTS

| 7,066,643 B2* | 6/2006 | Lee ...................... G01K 11/006 331/57 |
| 8,573,840 B2* | 11/2013 | Belandia ................ G01K 1/024 340/870.17 |
| 2004/0036626 A1* | 2/2004 | Chan .................... A01K 11/006 340/870.17 |
| 2005/0174255 A1* | 8/2005 | Horler .................... G08C 17/04 340/870.01 |
| 2006/0082009 A1* | 4/2006 | Quail .................. B22D 17/007 264/40.1 |

(Continued)

*Primary Examiner* — Mirellys Jagan
(74) *Attorney, Agent, or Firm* — Meyertons, Hood, Kivlin, Kowert & Goetzel, P.C.; Mark R. DeLuca

(57) ABSTRACT

A wireless sensor system is described which can be used to measure temperature and/or pressure within an electromagnetically shielded environment. The sensor system includes an embedded processor which intermittently transmits data from the sensors. In electromagnetically shielded environments, the processor transmits the data when the electromagnetically shielding components are moved into a non-shielding configuration.

17 Claims, 1 Drawing Sheet

(56) References Cited

U.S. PATENT DOCUMENTS

| | | | | |
|---|---|---|---|---|
| 2007/0206655 A1* | 9/2007 | Haslett | ................... | A61B 5/01 374/141 |
| 2008/0130706 A1* | 6/2008 | Kellner | ................... | A61L 2/28 374/45 |
| 2008/0144647 A1* | 6/2008 | Lyle | ................... | G06F 13/4045 370/458 |
| 2008/0272131 A1* | 11/2008 | Roberts | ................ | G01K 1/024 220/592.25 |
| 2009/0115604 A1* | 5/2009 | Thomas | ................ | F24F 11/001 340/540 |
| 2009/0121896 A1* | 5/2009 | Mitchell | ................ | H04Q 9/00 340/870.31 |
| 2010/0012645 A1* | 1/2010 | Baier | ................... | G01K 1/024 219/413 |
| 2013/0030723 A1 | 1/2013 | Gao et al. | | |
| 2013/0278377 A1 | 10/2013 | Slupsky et al. | | |

\* cited by examiner

WIRELESS SENSOR FOR ELECTROMAGNETICALLY SHIELDED APPLICATIONS AND METHOD OF COMMUNICATION

PRIORITY CLAIM

This application claims priority to U.S. Provisional Application Ser. No. 61/927,217 entitled "WIRELESS SENSOR FOR ELECTROMAGNETICALLY SHIELDED APPLICATIONS AND METHOD OF COMMUNICATION" filed Jan. 14, 2014, which is incorporated herein by reference in its entirety.

BACKGROUND OF THE INVENTION

1. Field of the Invention

The invention generally relates to sensors. More specifically, the invention relates to wireless temperature and pressure sensors.

2. Description of the Relevant Art

Injection molding is a manufacturing process for producing parts by injecting material into a mold. Generally, the process of injecting molding takes a material for the part being made and feeds the molten or melted material into a mold cavity where it cools and hardens to the configuration of the cavity.

During an injection molding process it is important to monitor the processing conditions to ensure the integrity of the parts being made. Temperature and pressure are processing conditions that are particularly important to the injection molding process. Traditional temperature detectors and pressure sensors rely on wired communication to transmit information regarding these parameters. In an injection molding environment, and other environments, the placement of these traditional sensors in or near a mold cavity can be difficult since it can be difficult to run wires through the molds or into the mold cavity to connect with the sensors.

While wireless sensors appear to solve the problem of running wires through the injection molding equipment, transmission of signals through injection molding equipment is difficult, since most molds are formed from a metal, which creates a shielding environment for the radio waves necessary to establish communication to the embedded sensors.

It is therefore desirable to have a sensor that overcomes these difficulties of the prior art sensors.

SUMMARY OF THE INVENTION

In an embodiment, a sensor system includes: a body; a pressure and/or temperature sensor disposed within the body and forming at least partially defining an exterior surface of the sensor system; a processor coupled to the pressure and/or temperature sensor, disposed within the body, wherein the processor collects data from the pressure and/or temperature sensor during use; an RF module, disposed within the body, coupled to the processor, wherein the RF module produces RF signals for transmitting data related to the pressure and/or temperature detected by the pressure and/or temperature sensors; an antenna, disposed within the body, coupled to the RF module; and a power supply coupled to the processor and the RF module.

In an embodiment, the sensor system includes a pressure sensor and a temperature sensor. The sensor system may also include a unique identification number, wherein the unique identification number is stored in the processor and provided with the data transmitted by the RF module.

The RF module may transmit signals intermittently. In some embodiments, the processor counts the number of transmission made by the RF module and provides the number of transmissions made by the RF module with the data transmitted by the RF module.

In some embodiments, the sensor system also includes a signal conditioning component, coupled to the pressure and/or temperature sensor and the processor.

In an embodiment, a method of monitoring the pressure and/or temperature within a mold of an injection molding system includes: placing material within a mold cavity defined by two or more mold members; placing a sensor system, as described above, within or proximate to one or more of the mold members; measuring the pressure and/or temperature of the mold cavity during molding using the sensor system; and transmitting pressure and/or temperature data collected during molding when the mold cavity is opened.

In an embodiment, an injection molding system includes one or more mold members, wherein the mold member(s) define an internal molding cavity; and a sensor system, as described above, disposed within one or more mold members, or within the mold cavity.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
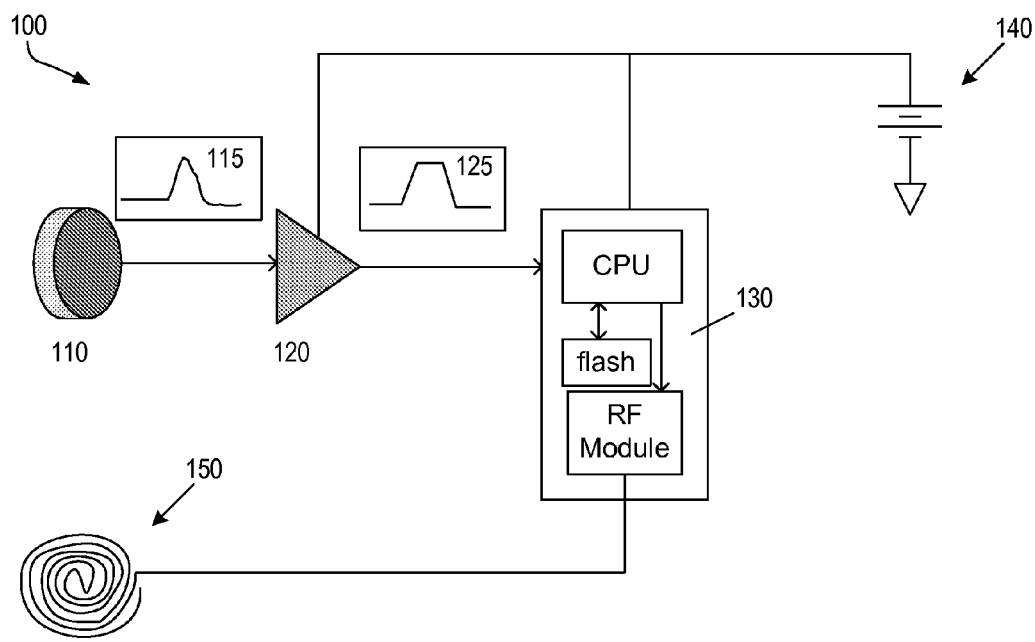
FIG. 1 depicts a schematic diagram of an embodiment of a wireless sensor system.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Described herein are wireless sensors that are capable of transmitting data in an electromagnetically shielded environment. In an embodiment, a wireless sensor includes a pressure sensor and/or a temperature sensor. The sensor also includes a processor, which is used to collect and transmit data, and a transmission system for sending the collected data for analysis by the user.

FIG. 1 depicts a schematic diagram of an embodiment of a wireless sensor system. Wireless sensor system 100 includes a sensor 110 which is capable of detecting either pressure or temperature changes and converting these changes into electrical signals. For detection of pressure, sensor 110 may be a piezoelectric sensor. For temperature sensing applications, sensor 110 may be a thermistor. Other types of sensors may be used. While a single sensor 110 is depicted, it should be understood that more than one sensor may be used. In some embodiments, a sensor system may include both a temperature sensor and a pressure sensor built into the same system. Sensor 110 may be a passive sensor (e.g., a piezoelectric disk) which does not require any power during operation. The use of a passive sensor can help reduce the power requirements of the system, helping to extend the life of the power source.

Sensor 110 is preferably a sensor that converts changes in pressure and/or temperature into electrical signals that are analyzed to determine the pressure and/or temperature of the environment that the sensor system is placed. The electrical signal obtained from the sensor may be conditioned to make signal processing easier. In an embodiment, a signal conditioning component 120 may receive the signal and alter the shape and/or intensity of the signal. In an embodiment, signal conditioning component is an operational amplifier which amplifies the signal received from the sensor and performs smoothing of the signal to simplify analysis. A schematic a signal processing is shown in FIG. 1. The crude signal 115 obtained from sensor 110 (typically a mV level signal) is passed to signal conditioning component 120, where the signal is smoothed and amplified (125) before being passed to processor 130. In an embodiment, the signal conditioning device is a 400 nA current operational amp. In the depicted configuration, the signal conditioning device is always on.

The signal obtained from the sensor is passed to processor 130. Processor 130 includes a central processing unit (CPU), memory (e.g., flash memory) and an RF module for producing radiofrequency signals. In an embodiment, memory is used to store data collected by the sensor. A unique identification number may be assigned to each sensor system. The unique identification number may be stored in the memory of processor 130. Each time data is transmitted from the sensor, the unique identification number may also be transmitted, allowing a user to easily identify the specific sensor that was used to collect the temperature and/or pressure information. In some embodiments, the processor may include non-volatile memory. The non-volatile memory may store mold information (e.g., the unique identification number) and other control parameters that will, typically, not change over the lifetime of the sensor.

Processor 130 may operate in three modes. In sleep mode, a minimal amount of power is supplied to the sensor. In one embodiment, about 100-300 nA of power is used to maintain processor 130 in sleep mode. While in sleep mode, most functions of processor 130 are turned off. When data is collected from the sensor, the data is transmitted through the operational amp to the processor. Upon receipt of the transmitted data, processor 130 moves from sleep mode to an active mode. In active mode, processor 130 receives the signal data (raw or conditioned) and convents the signal data into temperature and/or pressure values. Precalibration of the sensor prior to use allows the processor to correlate the specific voltage changes produced by the sensor to the actual temperature and/or pressure readings in the environment proximate to the sensor. The processor, in active mode also stores the processed signal data in the flash memory, where the data is ready for transmitting. During active mode the processor energy requirements vary from 100 µA to 250 µA.

In order for the user to receive the information collected by the sensor, the processor must transmit the information to the user. Information is transmitted to the user through passive antenna 150 during the transmission mode. Processor 130 includes an RF module which converts the temperature and/or pressure information, produced by the CPU (stored in the flash memory), into RF signals that can be transmitted to, and received by, an appropriate RF receiver. In one embodiment, the RF signals used to transmit the data to the receiver are in the 434 MHz ISM band. The signal may be provided, in a specific example, in a 7.2 ms burst (72 bits) at a power level of about 1 mW.

Transmission of the signal is the most power intensive process for the sensor system. Power consumption during transmission ranges from about 1 mA to 10 mA. Thus, processor 130 is configured to minimize operation of the transmission of data. As noted previously, the use of wireless transmission of data in injection molding systems (and other electromagnetically shielded devices) has been hindered by the electromagnetic shielding properties of the components of these systems. Rather than trying to provide a signal that can be received through the electromagnetically shielding material, which would consume a large amount of power, the processor is configured to transmit the data when the electromagnetically shielding components are moved into a non-shielding configuration. In an injection molding system, the transmission of the data is synchronized with the opening of the molds at the end of the molding cycle. The opening of the mold may be noted by the processor when there is a significant drop in pressure or temperature. The intermittent transmission of the data offers significant improvement to the power source compared to systems that continuously transmit data. Furthermore, by synchronizing the data transmission with the opening of the molds, the transmission is only performed when the signal can be received. Thus, when the molds are closed, and receiving an RF signal is difficult or impossible, there is no transmission of the data, and, therefore, no wasted use of the power source.

In an embodiment, the processor may keep track of the number of times the sensor has transmitted data. The number of transmissions may be provided during each time that the sensor transmits data. The number of transmissions may be used to determine when a sensor needs to be replaced.

In order for the sensor system to be useful for an extended period of time, the system should be optimized for power consumption. To keep the size of the sensor small, a small cell-type battery may be used to power the system. In an embodiment, battery 140 may be a silver-oxide battery. Other types of batteries may be used including lithium, nickel-metal halide, alkali, and cadmium batteries. A single battery may be used, or a stack of batteries provided, depending on the power needs of the sensor system. In a specific embodiment, a stack of two SR516 silver-oxide batteries are used which provide 3.1V, 12.5 mAh or power to the system. Using the specific configuration set forth herein, it is expected that the sensor will have a sleeping battery consumption of 650 nAb/h (0.00065 mAb/h). The system will have an active battery consumption of 171 uA/0.1 s and 9.2 mA for 7.2 ms during transmission. In the above described configuration, the sensor system, when using a 3.1V, 12 mAh battery, will have a shelf life (no transmissions) of about 19000 hours (26 months) and an active life of 540,000 transmissions. Other types of power sources may be used. For example a piezoelectric device coupled to one or more capacitors may be used as a power source.

Figure 2:
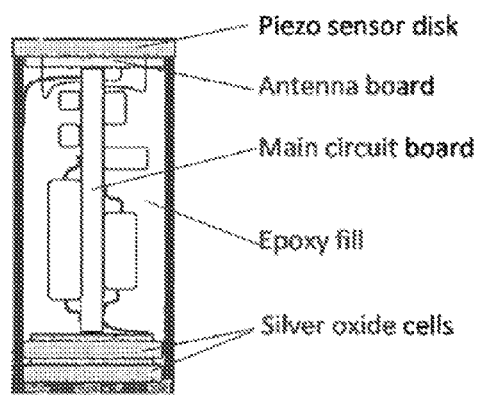
FIG. 2 depicts a cross-sectional view of an embodiment of a sensor system.

A specific embodiment of a sensor system is depicted in FIG. 2. In this embodiment, the sensor system is generally cylindrical and includes a piezo sensor disc (or thermistor disk) forming an outer surface (e.g., top) of the cylindrical sensor system. In some embodiments, the sensor may be protected by a coating formed on the outer surface of the sensor. An antenna board is placed proximate to the sensor disk, so that the antenna is close to the outer surface of the sensor system. Placing the antenna board near the outer surface of the sensor improves the transmission range of the sensor. The main circuit board, which includes the CPU, flash memory, and RF module, is placed in the center of the cylindrical body of the sensor system. Batteries (e.g., silver-oxide cells) are placed in the bottom of the cylindrical body. The body of the sensor system is filled with an epoxy to keep the components in place. The epoxy also serves as an insulating material, protecting the electronic components from the heat produced in the injection molding system. Generally, an epoxy material should be selected that will maintain the internal temperature of the sensor below about 125° C. (for military applications) or 85° C. (for industrial applications).

Batteries are placed opposite to the sensor to keep the batteries as far away from the heat source. Excess heating of the batteries can cause the batteries to lose power quickly and/or decompose. Since the sensor is positioned at or near a high temperature environment, placing the batteries on the opposing surface will help maintain the batteries at the lowest possible temperature. Generally, silver-oxide batteries should be maintained at a temperature of less than 60° C. In a specific example, the sensor has a length of between about 10 and 20 mm, and a diameter of between 5 and 10 mm.

The sensor system may be positioned within a mold of an injection molding system, with the sensor proximate to, or at, the interior surface of the mold. In this configuration the sensor of the sensor system may be in contact with the material being molded and may record the temperatures and/or pressures experienced by the material during the molding process. In another embodiment, the sensor system may be placed within a cavity formed by the molds.

The disclosed sensor systems offer a number of advantages over other sensor systems used in injection molding and other electromagnetically shielded applications. The sensors include an internal processor that stores data and only transmits data intermittently during times that the sensors are no longer completely shielded. Since the sensors rely on RF transmission of the data, there is no need for wires for data transmission. The sensors also include an internal power source, thus wires are not needed to supply power to the sensors.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A sensor system comprising:
   a body;
   a pressure and/or temperature sensor disposed within the body and forming at least partially defining an exterior surface of the sensor system;
   a processor coupled to the pressure and/or temperature sensor, disposed within the body, wherein the processor collects data from the pressure and/or temperature sensor during use;
   an RF module, disposed within the body, coupled to the processor, wherein the RF module produces RF signals for transmitting data related to the pressure and/or temperature detected by the pressure and/or temperature sensors;
   an antenna, disposed within the body, coupled to the RF module; and
   a power supply coupled to the processor and the RF module;
   wherein the processor counts the number of transmissions made by the RF module and provides the number of transmissions made by the RF module with the data transmitted by the RF module.

2. The sensor system of claim 1, wherein the sensor system comprises a pressure sensor and a temperature sensor.

3. The sensor system of claim 1, wherein the sensor system comprises a unique identification number, and wherein the unique identification number is stored in the processor and provided with the data transmitted by the RF module.

4. The sensor system of claim 1, wherein the RF module transmits signals intermittently.

5. The sensor system of claim 1, further comprising a signal conditioning component, coupled to the pressure and/or temperature sensor and the processor.

6. A method of monitoring the pressure and/or temperature within a mold of an injection molding system comprising:
   placing material within a mold cavity defined by two or more mold members;
   placing a sensor system within or proximate to one or more of the mold members, wherein the sensor system comprises:
   a body;
   a pressure and/or temperature sensor disposed within the body and forming at least partially defining an exterior surface of the sensor system;
   a processor coupled to the pressure and/or temperature sensor, disposed within the body, wherein the processor collects data from the pressure and/or temperature sensor during use;

an RF module, disposed within the body, coupled to the processor, wherein the RF module produces RF signals for transmitting data related to the pressure and/or temperature detected by the pressure and/or temperature sensors;

an antenna, disposed within the body, coupled to the RF module; and a power supply coupled to the processor and the RF module;

measuring the pressure and/or temperature of the mold cavity during molding using the sensor system; and transmitting pressure and/or temperature data collected during molding when the mold cavity is opened.

7. The method of claim 6, wherein the sensor system comprises a pressure sensor and a temperature sensor.

8. The method of claim 6, wherein the sensor system comprises a unique identification number, and wherein the unique identification number is stored in the processor and provided with the data transmitted by the RF module.

9. The method of claim 6, wherein the RF module transmits signals intermittently.

10. The method of claim 6, wherein the processor counts the number of transmission made by the RF module and provides the number of transmission made by the RF module with the data transmitted by the RF module.

11. The method of claim 6, wherein the sensor system further comprises a signal conditioning component, coupled to the pressure and/or temperature sensor and the processor.

12. An injection molding system comprising:
one or more mold members, wherein the mold member(s) define an internal molding cavity; and
a sensor system disposed within one or more mold members, or within the mold cavity, wherein the sensor system comprises:
a body;
a pressure and/or temperature sensor disposed within the body and forming at least partially defining an exterior surface of the sensor system;
a processor coupled to the pressure and/or temperature sensor, disposed within the body, wherein the processor collects data from the pressure and/or temperature sensor during use;
an RF module, disposed within the body, coupled to the processor, wherein the RF module produces RF signals for transmitting data related to the pressure and/or temperature detected by the pressure and/or temperature sensors;
an antenna, disposed within the body, coupled to the RF module; and
a power supply coupled to the processor and the RF module.

13. The injection molding system of claim 12, wherein the sensor system comprises a pressure sensor and a temperature sensor.

14. The injection molding system of claim 12, wherein the sensor system comprises a unique identification number, and wherein the unique identification number is stored in the processor and provided with the data transmitted by the RF module.

15. The injection molding system of claim 12, wherein the RF module transmits signals intermittently.

16. The injection molding system of claim 12, wherein the processor counts the number of transmission made by the RF module and provides the number of transmission made by the RF module with the data transmitted by the RF module.

17. The injection molding system of claim 12, wherein the sensor system further comprises a signal conditioning component, coupled to the pressure and/or temperature sensor and the processor.

* * * * *